US008078743B2

(12) United States Patent
Sharp et al.

(10) Patent No.: US 8,078,743 B2
(45) Date of Patent: Dec. 13, 2011

(54) PIPELINED PROCESSING OF RDMA-TYPE NETWORK TRANSACTIONS

(75) Inventors: Robert O. Sharp, Round Rock, TX (US); Kenneth G. Keels, Georgetown, TX (US); Brian S. Hausauer, Austin, TX (US); Eric Rose, Cedar Park, TX (US)

(73) Assignee: Intel-NE, Inc., Wilmington, DE (US)

( * ) Notice: Subject to any disclaimer, the term of this patent is extended or adjusted under 35 U.S.C. 154(b) by 1152 days.

(21) Appl. No.: 11/356,493

(22) Filed: Feb. 17, 2006

(65) Prior Publication Data

US 2007/0226750 A1 Sep. 27, 2007

(51) Int. Cl.
*G06F 15/16* (2006.01)

(52) U.S. Cl. ........ 709/230; 709/223; 709/250; 709/233; 370/412; 370/419

(58) Field of Classification Search .................. 709/250, 709/232, 213, 230, 216, 217, 212, 214, 219; 370/395.52, 392, 412, 463, 428, 389; 719/312; 711/206, 203
See application file for complete search history.

(56) References Cited

U.S. PATENT DOCUMENTS

| | | | |
|---|---|---|---|
| 5,400,326 A | 3/1995 | Smith |
| 5,434,976 A | 7/1995 | Tan et al. |
| 5,758,075 A | 5/1998 | Graziano et al. |
| 5,832,216 A | 11/1998 | Szczepanek |
| 5,953,511 A | 9/1999 | Sescila, III et al. |
| 6,052,751 A | 4/2000 | Runaldue et al. |
| 6,067,300 A | 5/2000 | Baumert et al. |
| 6,145,045 A | 11/2000 | Falik et al. |
| 6,199,137 B1 | 3/2001 | Aguilar et al. |

(Continued)

OTHER PUBLICATIONS

Shah, et al., "Direct Data Placement over Reliable Transports (Version 1.0)", RDMA Consortium document, Oct. 2002, pp. 1-35.

(Continued)

*Primary Examiner* — Barbara Burgess
(74) *Attorney, Agent, or Firm* — Christopher K. Gagne

(57) ABSTRACT

A computer system such as a server pipelines RNIC interface (RI) management/control operations such as memory registration operations to hide from network applications the latency in performing RDMA work requests caused in part by delays in processing the memory registration operations and the time required to execute the registration operations themselves. A separate QP-like structure, called a control QP (CQP), interfaces with a control processor (CP) to form a control path pipeline, separate from the transaction pipeline, which is designated to handle all control path traffic associated with the processing of RI control operations. This includes memory registration operations (MR OPs), as well as the creation and destruction of traditional QPs for processing RDMA transactions. Once the MR OP has been queued in the control path pipeline of the adapter, a pending bit is set which is associated with the MR OP. Processing of an RDMA work request in the transaction pipeline that has engendered the enqueued MR OP is permitted to proceed as if the processing of the MR OP has already been completed. If the work request gets ahead of the MR OP, the associated pending bit being set will notify the adapter's work request transaction pipeline to stall (and possibly reschedule) completion of the work request until the processing of the MR OP for that memory region is complete. When the memory registration process for the memory region is complete, the associated pending bit is reset and the adapter transaction pipeline is permitted to continue processing the work request using the newly registered memory region.

16 Claims, 13 Drawing Sheets

U.S. PATENT DOCUMENTS

| | | | |
|---|---|---|---|
| 6,243,787 B1 | 6/2001 | Kagan et al. | |
| 6,389,479 B1 | 5/2002 | Boucher et al. | |
| 6,400,730 B1 | 6/2002 | Latif et al. | |
| 6,408,347 B1 | 6/2002 | Smith et al. | |
| 6,418,201 B1 | 7/2002 | Holland et al. | |
| 6,427,171 B1 | 7/2002 | Craft et al. | |
| 6,502,156 B1 | 12/2002 | Sacker et al. | |
| 6,535,518 B1 | 3/2003 | Hu et al. | |
| 6,591,310 B1 | 7/2003 | Johnson | |
| 6,594,329 B1 | 7/2003 | Susnow | |
| 6,594,712 B1 | 7/2003 | Pettey et al. | |
| 6,601,126 B1 | 7/2003 | Zaidi et al. | |
| 6,625,157 B2 | 9/2003 | Niu et al. | |
| 6,658,521 B1 | 12/2003 | Biran et al. | |
| 6,661,773 B1 | 12/2003 | Pelissier et al. | |
| 6,675,200 B1 | 1/2004 | Cheriton et al. | |
| 6,690,757 B1 | 2/2004 | Bunton et al. | |
| 6,693,901 B1 | 2/2004 | Byers et al. | |
| 6,694,394 B1 | 2/2004 | Bachrach | |
| 6,697,868 B2 | 2/2004 | Craft et al. | |
| 6,704,831 B1 | 3/2004 | Avery | |
| 6,751,235 B1 | 6/2004 | Susnow et al. | |
| 6,760,307 B2 | 7/2004 | Dunning et al. | |
| 6,763,419 B2 | 7/2004 | Hoese et al. | |
| 6,778,548 B1 | 8/2004 | Burton et al. | |
| 7,093,024 B2 | 8/2006 | Craddock et al. | |
| 7,149,817 B2 | 12/2006 | Pettey | |
| 7,149,819 B2 | 12/2006 | Pettey | |
| 7,177,941 B2 | 2/2007 | Biran et al. | |
| 7,299,266 B2 | 11/2007 | Boyd et al. | |
| 7,308,551 B2 | 12/2007 | Arndt et al. | |
| 7,376,755 B2 | 5/2008 | Pandya | |
| 7,376,765 B2 | 5/2008 | Rangan et al. | |
| 7,376,770 B2 | 5/2008 | Arndt et al. | |
| 7,383,483 B2 | 6/2008 | Biran et al. | |
| 7,392,172 B2 | 6/2008 | Rostampour | |
| 7,401,126 B2 | 7/2008 | Pekkala et al. | |
| 7,426,674 B2 | 9/2008 | Anderson et al. | |
| 7,451,197 B2 | 11/2008 | Davis et al. | |
| 7,688,838 B1* | 3/2010 | Aloni et al. | 370/412 |
| 7,782,869 B1 | 8/2010 | Srinivasa | |
| 7,782,905 B2 | 8/2010 | Keels et al. | |
| 7,843,906 B1 | 11/2010 | Chidambaram et al. | |
| 7,849,232 B2 | 12/2010 | Sharp et al. | |
| 7,889,762 B2 | 2/2011 | Keels et al. | |
| 2001/0049740 A1 | 12/2001 | Karpoff | |
| 2002/0073257 A1 | 6/2002 | Beukema et al. | |
| 2002/0085562 A1 | 7/2002 | Hufferd et al. | |
| 2002/0147839 A1 | 10/2002 | Boucher et al. | |
| 2002/0161919 A1 | 10/2002 | Boucher et al. | |
| 2002/0172195 A1 | 11/2002 | Pekkala et al. | |
| 2003/0031172 A1 | 2/2003 | Grinfeld | |
| 2003/0050990 A1 | 3/2003 | Craddock et al. | |
| 2003/0097428 A1 | 5/2003 | Afkhami et al. | |
| 2003/0165160 A1 | 9/2003 | Minami et al. | |
| 2003/0169775 A1 | 9/2003 | Fan et al. | |
| 2003/0200284 A1 | 10/2003 | Philbrick et al. | |
| 2003/0217185 A1 | 11/2003 | Thakur et al. | |
| 2003/0237016 A1 | 12/2003 | Johnson et al. | |
| 2004/0010545 A1 | 1/2004 | Pandya | |
| 2004/0010594 A1 | 1/2004 | Boyd et al. | |
| 2004/0015622 A1 | 1/2004 | Avery | |
| 2004/0030770 A1 | 2/2004 | Pandya | |
| 2004/0037319 A1 | 2/2004 | Pandya | |
| 2004/0049600 A1* | 3/2004 | Boyd et al. | 709/250 |
| 2004/0049774 A1 | 3/2004 | Boyd et al. | |
| 2004/0062267 A1 | 4/2004 | Minami et al. | |
| 2004/0083984 A1 | 5/2004 | White | |
| 2004/0085984 A1 | 5/2004 | Elzur | |
| 2004/0093389 A1 | 5/2004 | Mohamed et al. | |
| 2004/0093411 A1 | 5/2004 | Elzur et al. | |
| 2004/0098369 A1 | 5/2004 | Elzur | |
| 2004/0100924 A1 | 5/2004 | Yam | |
| 2004/0153578 A1 | 8/2004 | Elzur | |
| 2004/0193908 A1 | 9/2004 | Garcia et al. | |
| 2004/0221276 A1 | 11/2004 | Raj | |
| 2005/0044264 A1 | 2/2005 | Grimminger et al. | |
| 2005/0080982 A1 | 4/2005 | Vasilevsky et al. | |
| 2005/0102682 A1 | 5/2005 | Shah et al. | |
| 2005/0149623 A1 | 7/2005 | Biran et al. | |
| 2005/0220128 A1* | 10/2005 | Tucker et al. | 370/412 |
| 2005/0223118 A1 | 10/2005 | Tucker et al. | |
| 2005/0265352 A1 | 12/2005 | Biran et al. | |
| 2006/0039374 A1* | 2/2006 | Belz et al. | 370/389 |
| 2006/0045098 A1 | 3/2006 | Krause | |
| 2006/0105712 A1 | 5/2006 | Glass et al. | |
| 2006/0126619 A1 | 6/2006 | Teisberg et al. | |
| 2006/0146814 A1 | 7/2006 | Shah et al. | |
| 2006/0193327 A1 | 8/2006 | Arndt et al. | |
| 2006/0195617 A1 | 8/2006 | Arndt et al. | |
| 2006/0230119 A1 | 10/2006 | Hausauer et al. | |
| 2006/0235977 A1 | 10/2006 | Wunderlich et al. | |
| 2006/0236063 A1 | 10/2006 | Hausauer et al. | |
| 2006/0248047 A1 | 11/2006 | Grier et al. | |
| 2006/0251109 A1 | 11/2006 | Muller et al. | |
| 2006/0259644 A1 | 11/2006 | Boyd et al. | |
| 2006/0274787 A1* | 12/2006 | Pong | 370/469 |
| 2007/0083638 A1 | 4/2007 | Pinkerton et al. | |
| 2007/0136554 A1* | 6/2007 | Biran et al. | 711/203 |
| 2007/0150676 A1* | 6/2007 | Arimilli et al. | 711/162 |
| 2007/0165672 A1 | 7/2007 | Keels et al. | |
| 2007/0168567 A1* | 7/2007 | Boyd et al. | 710/5 |
| 2007/0168693 A1* | 7/2007 | Pittman | 714/4 |
| 2007/0198720 A1 | 8/2007 | Rucker | |
| 2007/0208820 A1 | 9/2007 | Makhervaks et al. | |
| 2007/0226386 A1 | 9/2007 | Sharp et al. | |
| 2008/0028401 A1 | 1/2008 | Geisinger | |
| 2008/0043750 A1 | 2/2008 | Keels et al. | |
| 2008/0147822 A1 | 6/2008 | Benhase et al. | |
| 2008/0244577 A1 | 10/2008 | Le et al. | |
| 2009/0254647 A1* | 10/2009 | Elzur et al. | 709/223 |
| 2010/0332694 A1 | 12/2010 | Sharp et al. | |
| 2011/0099243 A1 | 4/2011 | Keels et al. | |

OTHER PUBLICATIONS

"Intel Virtual Interface (VI) Architecture Performance Suite User's Guide", Preliminary Version V0.3, Intel Corporation, Dec. 16, 1998, 28 pages.

Jinzanki, "Construction of Virtual Private Distributed System of Comet", RWC 2000 Symposium, Japan, XP002243009, Jan. 2000, pp. 1-3.

Pathikonda, et al., "Virtual Interface (VI) Architecture Overview", Enterprise Server Group, Intel Corporation, Apr. 1998, pp. 1-33.

Speight, et al., "Realizing the Performance Potential of the Virtual Interface Architecture", Proceedings of the 13th international conference on Supercomputing, Rhodes, Greece, 1999, pp. 184-192.

Response to Non-Final Office Action received for U.S. Appl. No. 09/784,761, filed Jul. 12, 2006, 35 pages.

Non-Final Office Action received for U.S. Appl. No. 09/784,761, mailed on Feb. 14, 2006, 19 pages.

Response to Non-Final Office Action received for U.S. Appl. No. 09/784,761, filed Nov. 26, 2005, 34 pages.

Final Office Action received for U.S. Appl. No. 09/784,761, mailed on Jul. 29, 2005, 25 pages.

Response to Non-Final Office Action received for U.S. Appl. No. 09/784,761, filed Apr. 19, 2005, 34 pages.

Non-Final Office Action received for U.S. Appl. No. 09/784,761, mailed on Feb. 14, 2005, 24 pages.

Response to Non-Final Office Action received for U.S. Appl. No. 09/784,761, filed Sep. 29, 2004, 15 pages.

Non-Final Office Action received for U.S. Appl. No. 09/784,761, mailed on Jul. 12, 2004, 12 pages.

Non-Final Office Action received for U.S. Appl. No. 09/817,008, mailed on Jul. 9, 2004, 19 pages.

Response to Non-Final Office Action received for U.S. Appl. No. 09/817,008, filed Nov. 4, 2004, 19 pages.

Non-Final Office Action received for U.S. Appl. No. 09/817,008, mailed on Nov. 18, 2005, 23 pages.

Response to Non-Final Office Action received for U.S. Appl. No. 09/817,008, filed Apr. 18, 2006, 33 pages.

Final Office Action received for U.S. Appl. No. 09/817,008, mailed on Jul. 14, 2006, 7 pages.

Response to Final Office Action received for U.S. Appl. No. 09/817,008, filed Nov. 14, 2006, 40 pages.
Non-Final Office Action received for U.S. Appl. No. 09/817,008, mailed on Feb. 9, 2007, 17 pages.
Response to Non-Final Office Action received for U.S. Appl. No. 09/817,008, filed May 9, 2007, 5 pages.
Non-Final Office Action received for U.S. Appl. No. 09/817,008, mailed on Jul. 25, 2007, 19 pages.
Response to Non-Final Office Action received for U.S. Appl. No. 09/817,008, filed Nov. 26, 2007, 21 pages.
Notice of Allowance received for U.S. Appl. No. 09/817,008, mailed on Mar. 28, 2008, 23 pages.
Amendment after Notice of Allowance received for U.S. Appl. No. 09/817,008, filed Apr. 2, 2008, 20 pages.
Non-Final Office Action received for U.S. Appl. No. 11/357,446, mailed on Jun. 3, 2008, 24 pages.
Response to Non-Final Office Action received for U.S. Appl. No. 11/357,446, filed Nov. 10, 2008, 26 pages.
Final Office Action received for U.S. Appl. No. 11/357,446, mailed on Dec. 31, 2008, 22 pages.
Non-Final Office Action received for U.S. Appl. No. 11/315,685, mailed on Feb. 18, 2009, 25 pages.
Response to Non-Final Office Action received for U.S. Appl. No. 11/315,685, filed Apr. 30, 2009, 22 pages.
Non-Final Office Action received for U.S. Appl. No. 11/357,445, mailed on Aug. 4, 2008, 18 pages.
Response to Non-Final Office Action received for U.S. Appl. No. 11/357,445, filed Nov. 7, 2008, 19 pages.
Final Office Action received for U.S. Appl. No. 11/357,445, mailed on Dec. 24, 2008, 19 pages.
Response to Final Office Action received for U.S. Appl. No. 11/357,445, filed Mar. 4, 2009, 18 pages.
Non-Final Office Action received for U.S. Appl. No. 11/357,445, mailed on Apr. 24, 2009, 21 pages.
Non-Final Office Action received for U.S. Appl. No.11/357,449, mailed on Jun. 4, 2009, 13 pages.
Non-Final Office Action received for U.S. Appl. No. 10/737,556, mailed on Jul. 6, 2004, 10 pages.
Supplemental Non-Final Office Action received for U.S. Appl. No. 10/737,556, mailed on Sep. 21, 2004, 8 pages.
Response to Supplemental Non-Final Office Action received for U.S. Appl. No. 10/737,556, filed Oct. 12, 2004, 4 pages.
Non-Final Office Action received for U.S. Appl. No. 10/737,556, mailed on Jan. 26, 2005, 11 pages.
Response to Non-Final Office Action received for U.S. Appl. No. 10/737,556, filed Apr. 19, 2005, 24 pages.
Final Office Action received for U.S. Appl. No. 10/737,556, mailed on Jul. 28, 2005, 19 pages.
Response to Final Office Action received for U.S. Appl. No. 10/737,556, filed Nov. 26, 2005, 27 pages.
Non-Final Office Action received for U.S. Appl. No. 10/737,556, mailed on Feb. 14, 2006, 14 pages.
Response to Non-Final Office Action received for U.S. Appl. No. 10/737,556, filed Jul. 12, 2006, 31 pages.
Notice of Allowance received for U.S. Appl. No. 10/737,556, mailed on Oct. 3, 2006, 12 pages.
Notice of Allowance received for U.S. Appl. No. 09/784,761, mailed on Oct. 6, 2006, 14 pages.
Mayo, John S., "The role of microelectronics in communication", Scientific American, Sep. 1977, pp. 192-209.
Warmke, Doug, "Building Up Chips Using VHDL and Synthesis", System Design, Dec. 1994/Jan. 1995, 7 pages.
Non-Final Office Action received for U.S. Appl. No. 11/356,501, mailed on Dec. 26, 2007, 12 pages.
Response to Non-Final Office Action received for U.S. Appl. No. 11/356,501, filed Mar. 26, 2008, 16 pages.
Non-Final Office Action received for U.S. Appl. No. 11/356,501, mailed on Jul. 7, 2008, 10 pages.
Response to Non-Final Office Action received for U.S. Appl. No. 11/356,501, filed Nov. 6, 2008, 16 pages.
Final Office Action received for U.S. Appl. No. 11/356,501, mailed on Jan. 22, 2009, 12 pages.
Response to Final Office Action received for U.S. Appl. No. 11/356,501, filed Apr. 2, 2009, 15 pages.
Notice of Allowance received for U.S. Appl. No. 11/356,501, mailed on Jun. 11, 2009, 8 pages.
Final Office Action received for U.S. Appl. No. 11/315,685, mailed on Aug. 11, 2009, 34 Pages.
Response to Non-Final Office Action received for U.S. Appl. No. 11/357,445, filed Jul. 8, 2009, 18 Pages.
Response to Non-Final Office Action received for U.S. Appl. No. 11/357,449, filed Aug. 17, 2009, 19 Pages.
Notice of Allowance received for U.S. Appl. No. 11/356,501, mailed on Aug. 7, 2009, 22 Pages.
Final Office Action received for U.S. Appl. No. 11/357,445, mailed on Sep. 10, 2009, 43 Pages.
Response to Final Office Action received for U.S. Appl. No. 11/315,685, filed Sep. 17, 2009, 22 Pages.
Amendment after Notice of Allowance received for U.S. Appl. No. 11/356,501, filed Oct. 8, 2009, 11 Pages.
Response to Final Office Action received for U.S. Appl. No. 11/357,445, filed Nov. 10, 2009, 17 Pages.
Notice of Allowance received for U.S. Appl. No. 11/356,501, mailed on Nov. 24, 2009, 12 Pages.
Office Action received for U.S. Appl. No. 11/357,449, mailed on Nov. 18, 2009, 31 Pages.
Office Action received for U.S. Appl. No. 11/624,849, mailed on Nov. 23, 2009, 34 Pages.
Office Action received for U.S. Appl. No. 11/357,449, mailed on Dec. 21, 2009, 8 Pages.
Response to Office Action received for U.S. Appl. No. 11/357,449, filed Dec. 8, 2009, 13 Pages.
Office Action received for U.S. Appl. No. 11/315,685, mailed on Jan. 4, 2010, 26 Pages.
Response to Office Action received for U.S. Appl. No. 11/624,849, filed Jan. 22, 2010, 15 Pages.
Response to Office Action received for U.S. Appl. No. 11/357,449, filed Mar. 4, 2010, 12 Pages.
Response to Office Action received for U.S. Appl. No. 11/315,685, filed Mar. 5, 2010, 24 Pages.
Office Action received for U.S. Appl. No. 11/624,849, mailed on Mar. 10, 2010, 15 Pages.
Office Action received for U.S. Appl. No. 11/356,500, mailed on Mar. 18, 2010, 28 Pages.
Amendment after Notice of Allowance received for U.S. Appl. No. 11/356,501, filed Jan. 29, 2010, 10 Pages.
Response to Office Action received for U.S. Appl. No. 11/624,849, filed Mar. 31, 2010, 14 Pages.
Response to Final Office Action received for U.S. Appl. No. 11/315,685, filed Jul. 8, 2010, 23 pages.
Response to the Non Final Office Action received for U.S. Appl. No. 11/624,849, filed Jul. 29, 2010, 12 pages.
Non-Final Office Action received for U.S. Appl. No. 11/356,500, mailed on Aug. 3, 2010, 17 pages.
Notice of Allowance received for U.S. Appl. No. 11/356,501, mailed on Aug. 19, 2010, 15 pages.
Response to Non Final Office Action field for U.S. Appl. No. 11/356,500, filed Oct. 7, 2010, 10 pages.
Final Office Action received for U.S. Appl. No. 11/624,849, mailed on Oct. 14, 2010, 11 pages.
Response to Final Office Action received for U.S. Appl. No. 11/624,849, filed Dec. 8, 2010, 9 pages.
Non-Final Office Action received for U.S. Appl. No. 11/315,685, mailed on Dec. 20, 2010, 32 pages.
Final Office Action received for U.S. Appl. No. 11/356,500, mailed on Dec. 21, 2010, 41 pages.
Notice of Allowance received for U.S. Appl. No. 11/624,849, mailed on Dec. 20, 2010, 6 pages.
Office Action received for U.S. Appl. No. 12/874,739, mailed on Jan. 19, 2011, 12 pages.
Response to Office Action received for U.S. Appl. No. 11/315,685, filed Feb. 25, 2011, 20 pages.
Office Action received for U.S. Appl. No. 11/315,685, mailed on Mar. 7, 2011, 31 pages.

Response to Office Action received for U.S. Appl. No. 11/356,500, filed Mar. 17, 2011, 10 pages.
Response to Office Action received for U.S. Appl. No. 12/874,739, filed Mar. 3, 2011, 10 pages.
Office Action received for U.S. Appl. No. 11/356,500, mailed on Mar. 31, 2011, 14 pages.
Office Action Received for U.S. Appl. No. 11/315,685, mailed on May 9, 2011, 39 Pages.
Response to Office Action Received for U.S. Appl. No. 11/315,685, filed Apr. 20, 2011, 23 pages.
Response to Office Action Received for U.S. Appl. No. 11/315,685, filed Jun. 14, 2011, 26 Pages.
Notice of Allowance Received for U.S. Appl. No. 12/874,739, mailed on Jun. 1, 2011, 115 pages.
Response to Office Action Received for U.S. Appl. No. 11/356,500, filed Jun. 10, 2011, 12 pages.
Response to Non-Final Office Action Received for U.S. Appl. No. 11/356,493, filed Apr. 15, 2011, 10 pages.
Response to Non-Final Office Action Received for U.S. Appl. No. 11/356,493, filed Jul. 13, 2011, 10 pages.
Office Action received for U.S. Appl. No. 11/356,501, mailed on Apr. 13, 2010, 16 Pages.
Response to Office Action received for U.S. Appl. No. 11/356,500, filed May 17, 2010, 15 Pages.
Office Action received for U.S. Appl. No. 11/315,685, mailed on May 14, 2010, 34 Pages.
Office Action received for U.S. Appl. No.11/624,849, mailed on May 24, 2010, 11 Pages.
Response to Office Action received for U.S. Appl. No. 11/356,501, filed May 28, 2010, 14 Pages.
Notice of Allowance received for U.S. Appl. No. 11/357,449, mailed on Jun. 8, 2010, 13 Pages.

* cited by examiner

| | Local Node Application | Local Node NIC Control Processor | Local Node NIC Tx Pipeline | Remote Node Application |
|---|---|---|---|---|
| 1 | -- Call Memory Reg. Verb for Memory Region x (sets Pending Bit)<br>-- Enqueue Memory Reg Op on the SQ of the CQP<br>-- Ring doorbell | | | |
| 2 | -- Post a Send operation on QPn using Memory Region x (includes a write to the WQE Allocate reg) | -- Begin processing the Memory Reg Op (including Set up MRTE, pull page list from Host Memory, set up PBL in LMI) | | |
| 3 | | ... continue ... | -- Begin processing the QPn Send Op<br>Note: Pending bit for Memory Region x (source of Data for Send) is set.<br>-- Suspend the Send Op | |
| 4 | | -- Complete Memory Registration process for Memory Region x<br>-- Clear associated Pending Bit | | |
| 5 | | | -- Resume processing the QPn Send Op<br>Note: Pending bit for Memory Region x (source of Data for Send) is cleared.<br>-- Proceed with the Send Op | |

FIG. 7

| | Local Node Application | Local Node NIC Control Processor | Local Node NIC Tx Pipeline | Local Node NIC Rx Pipeline | Remote Node Application |
|---|---|---|---|---|---|
| 1 | - Call Memory Reg. Verb for Memory Region x (sets Pending Bit)<br>- Enqueue Memory Reg. Op on the SQ of the CQP.<br>- Ring doorbell. | | | | |
| 2 | | - Begin processing the Memory Reg Op (including set up of MRTE, pull page list from Host Memory, set up PBL in LMM) | | | |
| 3 | | ...continue... | - Begin processing the QP n Send Op<br>Note: Memory Region x not used so it is not suspended | | |
| 4 | | ...continue... | | | - Receive the QP n Send Op requesting an RDMA Write to the Memory Region x STag<br>- Post RDMA Write OP on SQ |
| 5 | | ...continue... | | - Receive RDMA Write from Remote App<br>Note: Memory Region x is data sink for RDMA Write - has its pending bit set.<br>- Suspend RDMA Write Op | |
| 6 | | - Complete Memory Registration process for Memory Region x<br>- Clear assoc. Pending Bit | | | |
| 7 | | | | Allow the suspended RDMA Write to complete. | |

FIG. 8

PIPELINED PROCESSING OF RDMA-TYPE NETWORK TRANSACTIONS

BACKGROUND OF THE INVENTION

The present invention pertains to the field of computer architecture and more specifically to the efficient processing of RNIC interface (RI) management control operations (e.g. memory registration) required by RDMA (Remote Direct Memory Access) type work requests issued by an RNIC interface (RI) running on computer systems such as servers.

DESCRIPTION OF THE RELATED ART

In complex computer systems, particularly those in large transaction processing environments, a group of servers is often clustered together over a network fabric that is optimized for sharing large blocks of data between the servers in the cluster. In such clustering fabrics, the data is transferred over the fabric directly between buffers resident in the host memories of the communicating servers, rather than being copied and packetized first by the operating system (OS) of the sending server and then being de-packetized and copied to memory by the OS of the receiving server in the cluster. This saves significant computing resources in the transacting servers in the form of OS overhead that may be applied to other tasks. This technique for establishing connections that bypass the traditional protocol stack resident in the OS of transacting servers and instead transacting data directly between specified buffers in the user memory of the transacting servers is sometimes generally referred to as remote data memory access or RDMA.

Different standards have been established defining the manner and the protocols by which direct memory connections between servers are securely established and taken down, as well as the manner in which data is transferred over those connections. For example, Infiniband is a clustering standard that is typically deployed as a fabric that is separate and distinct from fabrics handling other types of transactions between the servers and devices such as user computers or high-performance storage devices. Another such standard is the iWARP standard that was developed by the RDMA Consortium to combine RDMA type transactions with packet transactions using TCP/IP over Ethernet. Copies of the specifications defining the iWARP standard may be obtained at the Consortium's web site at www.rdmaconsortium.org. The iWARP specifications and other documents available from the RDMA Consortium web site are incorporated herein in their entirety by this reference. These and other RDMA standards, while differing significantly in their transaction formats, are typically predicated on a common paradigm called a queue pair (QP). The QP is the primary mechanism for communicating information about where data is located that should be sent or received using one of the standard RDMA network data transfer operations.

A QP is typically made up of a send queue (SQ) and a receive queue (RQ), and can also be associated with at least one completion queue (CQ). QPs are created when an application running on a local server issues a request to an RNIC interface (RI) that a memory transaction be processed that directly accesses host memory in the local server and possibly host memory in a remote server. The QPs are the mechanism by which work request operations associated with the processing of the transaction request made by the application are actually queued up, tracked and processed by the RNIC adapter.

The memory region(s) specified in a direct memory transaction are logically (although not typically physically) contiguous. Thus, the RI also coordinates retrieving a virtual to physical translation for the pages of physical memory actually used by a memory region and programs the RNIC adapter with this information so that the RNIC may directly access the actual physical locations in host memory that make up the memory region as if they were physically contiguous. Access privileges are also retrieved for that memory region and stored in the RNIC with the address translation information. This RI management process is known as memory registration. Most RI management processes, including memory registration, are presumed by the RDMA standards to be a synchronous process such that they will complete before any associated work request is processed by the RNIC on behalf of the application. Thus, a management process such as memory registration blocks the processing of any associated work request by the RNIC until it is complete.

Because memory registration operations (MR OPs) must access many of the same resources in the adapter that are also processing the execution of previously enqueued work requests, because they can be large in number, and because they can be quite time consuming to perform when the virtual to physical translations lead to many physical addresses which all must be transferred to and stored within the RNIC, the completion of memory registration operations may be significantly delayed. This forces the adapter to block further processing of work requests associated with the MR OPs for the entire length of the delay. These factors can significantly increase the overall transaction latency from the perspective of the application, and thus decrease throughput of the fabric in general. This may not be tolerable for many applications.

Therefore, it would be desirable to decrease the latency of RDMA type transactions (and thereby increase network throughput) between servers caused by the blocking of RNIC work requests while they await completion of requisite RI management transactions such as memory registration operations. It would be further desirable to achieve this reduced latency/increased throughput while maintaining compatibility with the specifications of RDMA protocols that require serial completion of memory registration operations prior to performing RDMA memory operations from and to those regions.

BRIEF DESCRIPTION OF DRAWINGS

FIG. 7 is a parallel sequence diagram describing one scenario in the execution of a Local Send Operation in accordance with an embodiment of the invention.

FIG. 8 is a parallel sequence diagram describing one scenario in the execution of a Remote RDMA Write Operation in accordance with an embodiment of the invention.

DETAILED DESCRIPTION OF THE DRAWINGS

Figure 1:
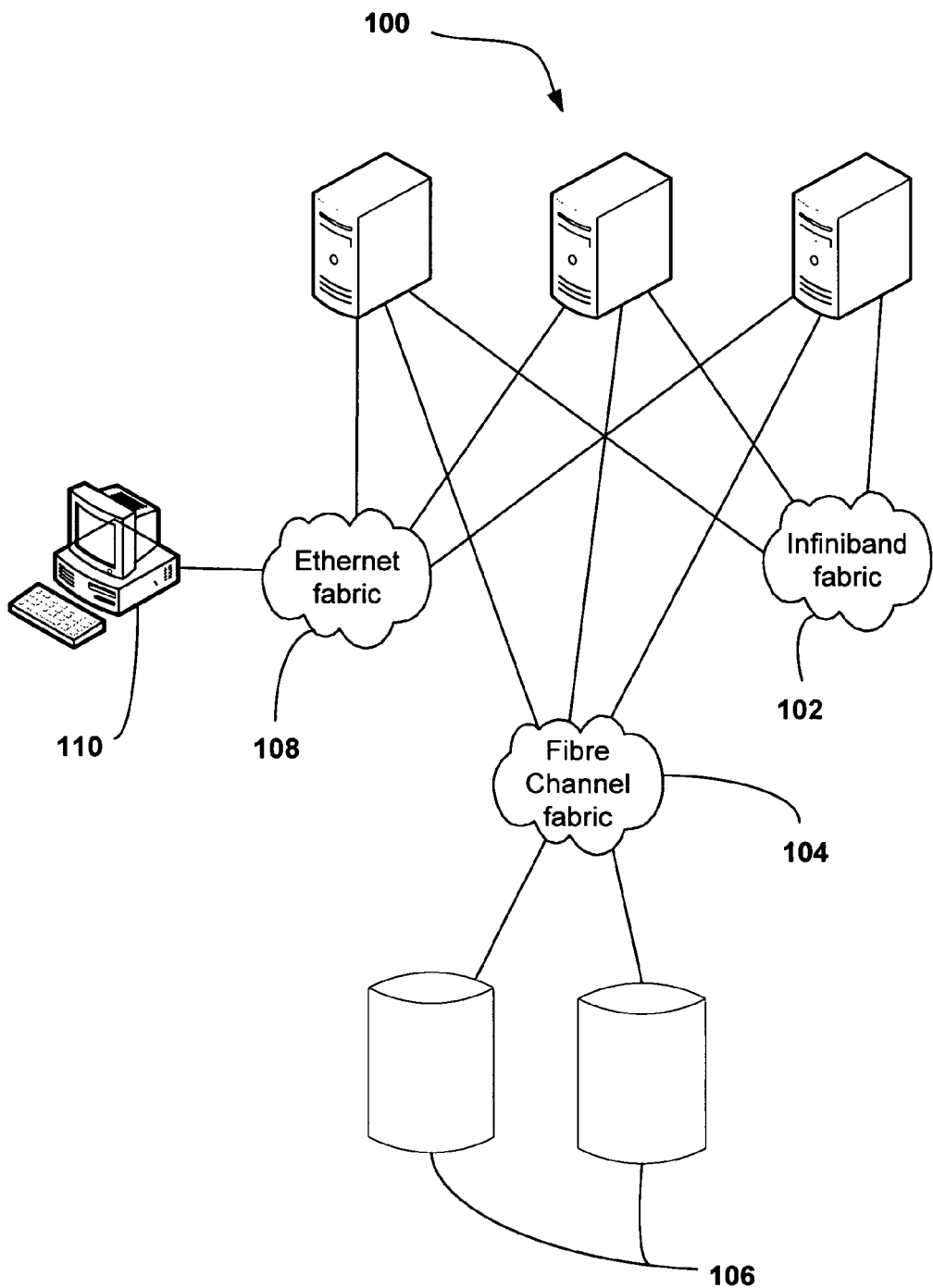
FIG. 1 is a block diagram of a computer system including clustering, user access and storage area networking according to the prior art.

Processing of RDMA type network transactions between servers over a network typically requires that the memory regions comprising the source and target buffers for such transactions be pre-registered with their respective RDMA capable adapters through which the direct data placement transactions will be conducted. The memory registration process provides each adapter with a virtual to physical address translation for the pages of physical memory that make up the contiguous virtual memory region being specified in the RDMA operation, as well as the access privilege information associated with the memory region. Specifications for RDMA standard protocols, such as iWARP, require that this memory registration process be complete before the work request generated in response to the RDMA transaction specifying the memory region may be processed.

Embodiments of the present invention are disclosed herein that provide two separate pipelines. One is the traditional transmit and receive transaction pipeline used to process RDMA work requests, and the other is a management/control pipeline that is designated to handle RI control operations such as the memory registration process. Embodiments of the invention employ a separate QP-like structure, called a control QP (CQP), which interfaces with a control processor (CP) to form the pipeline designated to handle all control path traffic associated with the processing of work requests, including memory registration operations (MR OPs), the creation and destruction of QPs used for posting and tracking RDMA transactions requested by applications running on the system.

In processing an RDMA memory transaction request from an application in accordance with embodiments of the invention, an RDMA verb is called that identifies the requisite RI management processes that must be executed to program the adapter (i.e. RNIC) in support of that memory transaction. Among these is typically a memory registration operation (MR OP) that is enqueued in a CQP of the adapter. Once the MR OP has been queued in the control path pipeline of the adapter to register the memory region specified by the memory transaction, a pending bit is set for that memory region and the call to the RDMA verb is returned. The RDMA transaction is posted to the appropriate QP and the RI generates a work request for the adapter specifying access to the memory region being registered by the pending MR OP. This work request is enqueued in the transaction pipeline of the adapter.

The processing of the work request is permitted to proceed as if the processing of the associated MR OP has already been completed. If the work request gets ahead of the MR OP, the pending bit associated with the memory region being registered will notify the adapter's work request transaction pipeline to stall (and possibly reschedule) completion of the work request until the processing of the MR OP for that memory region is complete. When the memory registration process for the memory region is complete, the pending bit for that memory region is reset and the adapter transaction pipeline is permitted to continue processing the work request using the newly registered memory region. Whenever the MR OP completes prior to the adapter transaction pipeline attempting to complete the QP work request, no transaction processing is stalled and the latency inherent in what has been traditionally performed as a serial process is completely hidden from the application requesting the RDMA memory transaction. This serves to lower the overall latency as well as increase the throughput of the network commensurately with the number and size of pending memory registration operations. At the same time, the memory registration process is guaranteed to complete before the work request is completed, thus maintaining compatibility with the RDMA specification.

FIG. 1 illustrates a group of servers 100 that are clustered together over a network fabric such as Infiniband fabric 102, a system configuration known to those of skill in the art. To further improve performance, these clustered servers 100 can be provided with high-performance access to mass storage, illustrated as storage units 106, over a separate storage area network (SAN) such as Fibre Channel fabric 104. The Fibre Channel architecture of the SAN 104 is optimized for mass storage access type transactions. User computers or other user devices 110 can be provided access to the cluster of servers 100 through yet another distinct network, such as an Ethernet network 108.

Figure 2:
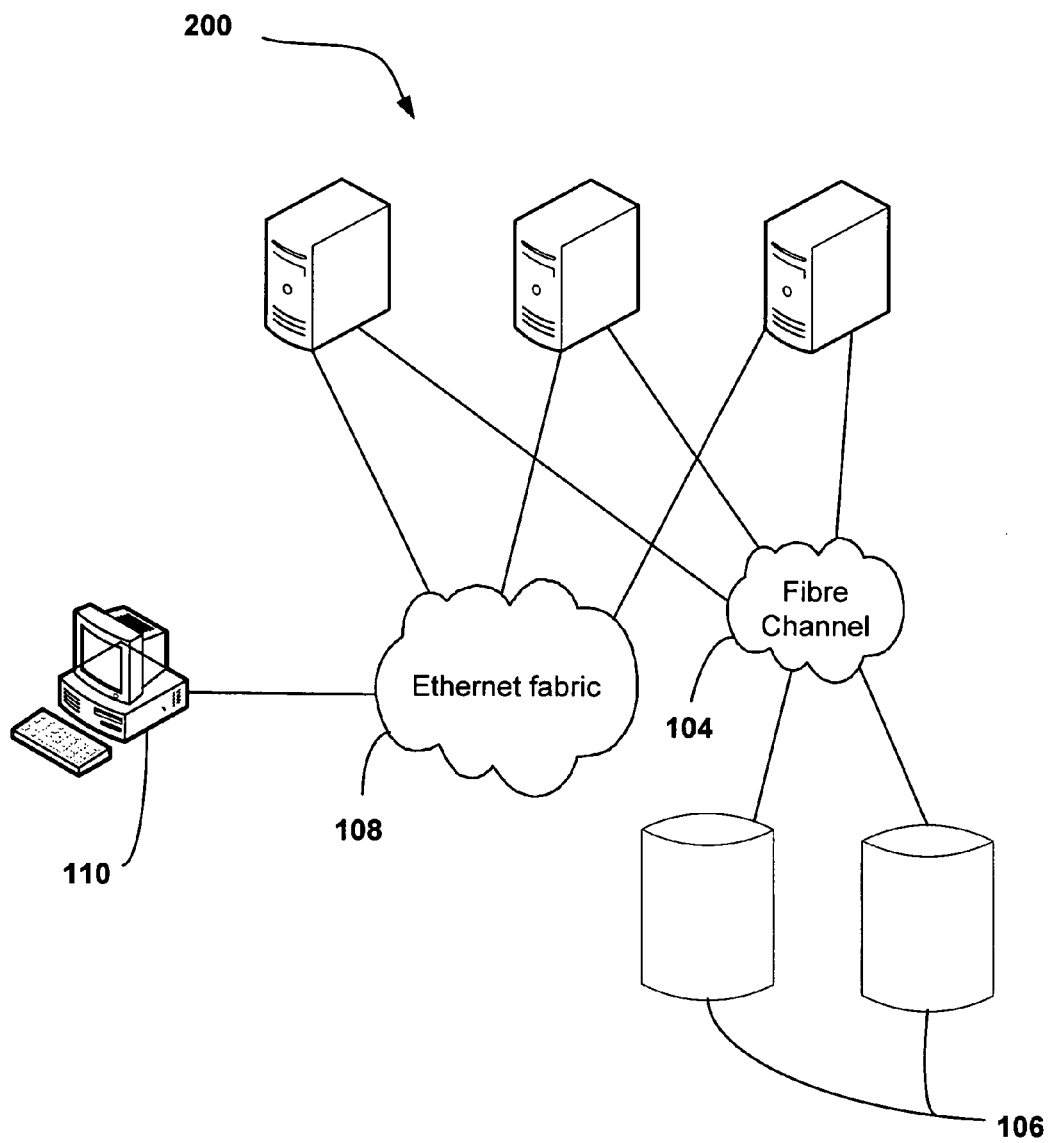
FIG. 2 is a block diagram of a computer system including a common clustering and user access fabric and a storage area networking fabric according to the prior art.

FIG. 2 illustrates yet another system configuration known to those of skill in the art. In this example, the network transactions between the clustered servers 200 are performed over the Ethernet fabric 108, along with those packetized transactions typically transacted over the Ethernet fabric 108 between the servers 200 and user devices 100. Each of the clustered servers 200 of FIG. 2 includes RDMA capable adapter cards (not shown) that can coordinate RDMA type memory transactions over the Ethernet fabric 108 as well as adapters that can handle standard Ethernet packet transactions over TCP/IP. The operation of the host processors and the RDMA adapters of the servers 200 comply with the iWARP specification as developed by the RDMA Consortium as previously discussed and which has been incorporated herein by reference.

Figure 3A:
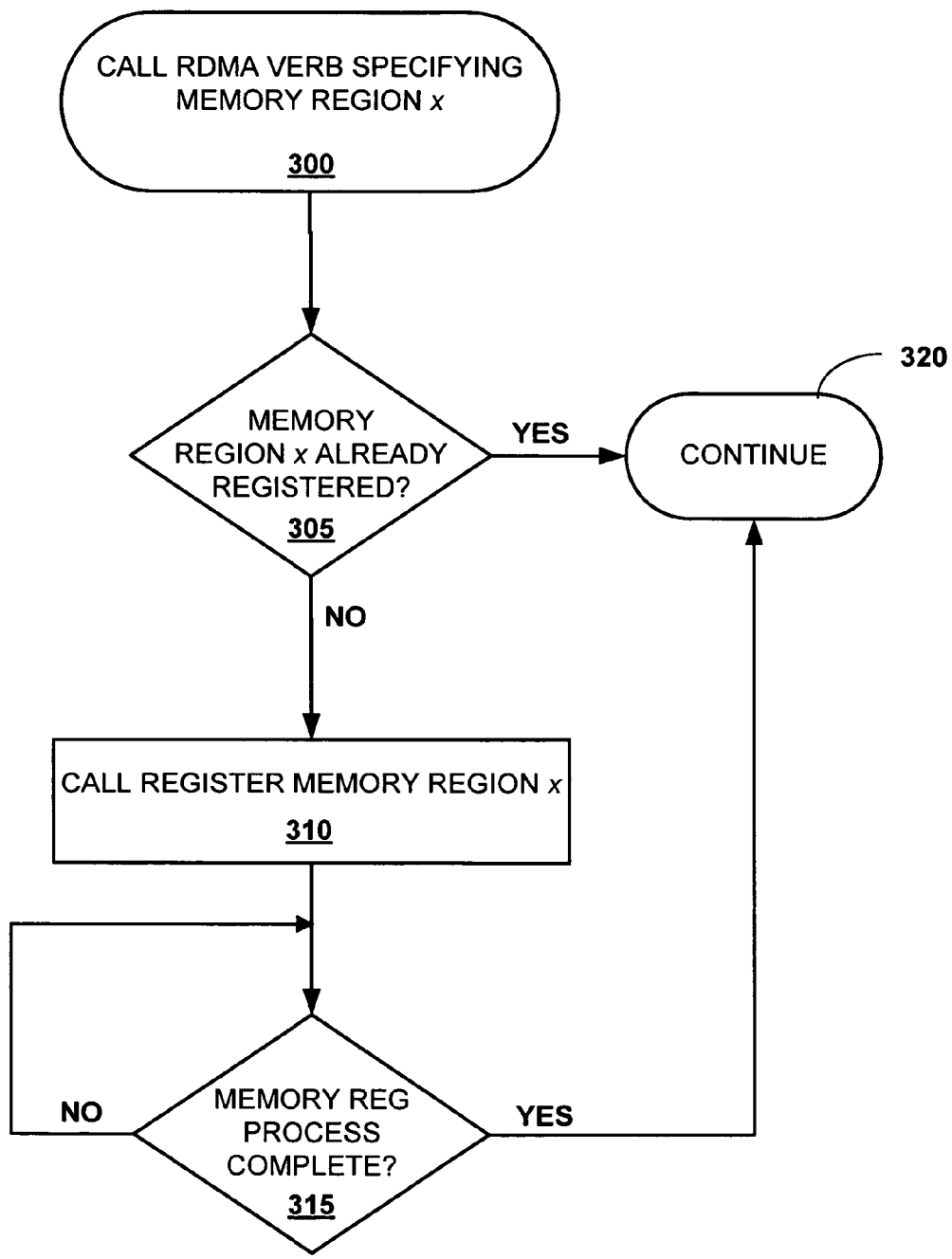
FIG. 3A is a process flow diagram describing execution of a QP operation performed by the computer system of FIGS. 1 and 2 in accordance with the prior art.
Figure 3B:
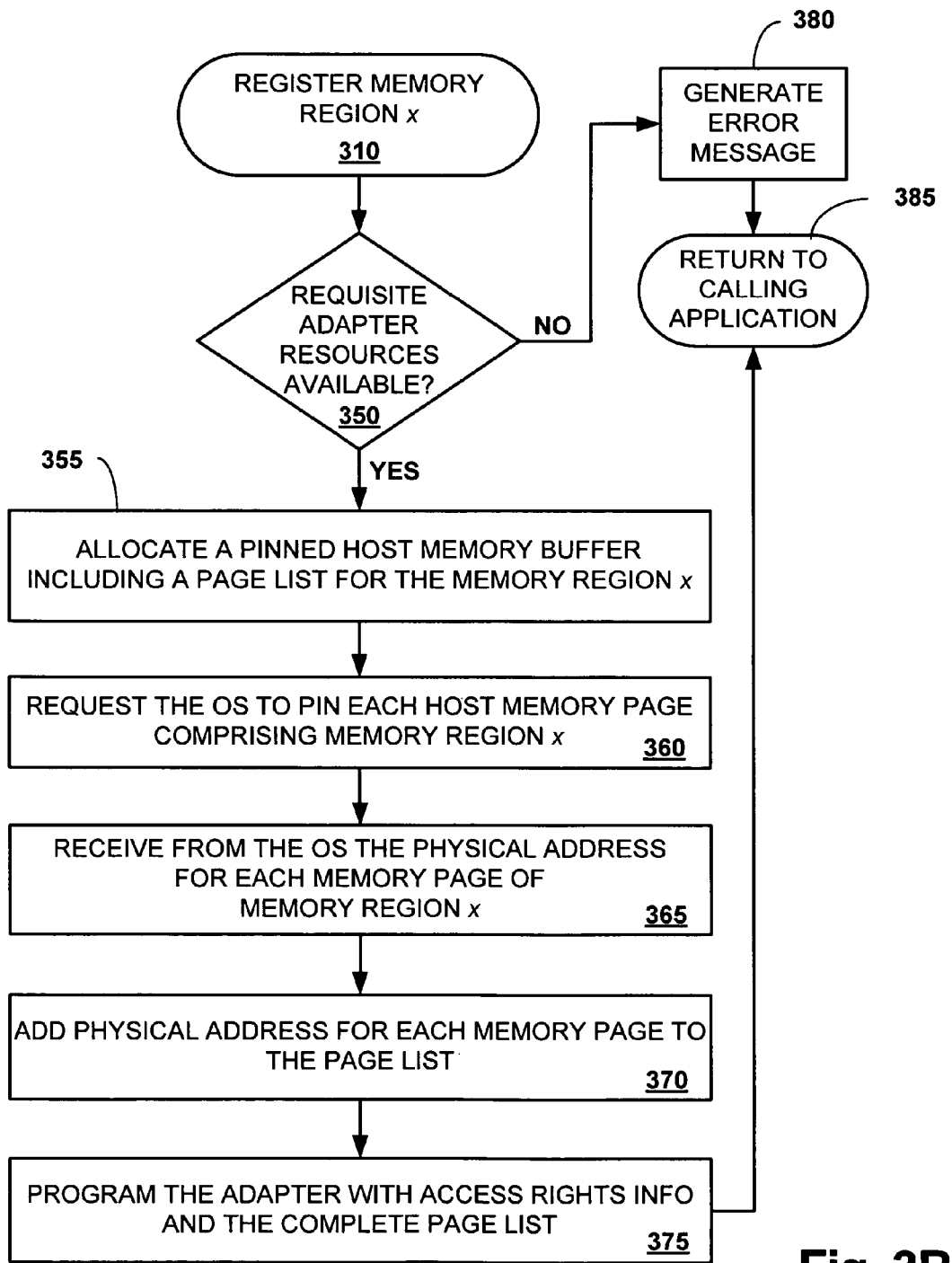
FIG. 3B is a process flow diagram describing a serial memory registration process called by the process of FIG. 3 in accordance with the prior art.

Common to both clustering implementations of FIGS. 1 and 2 is the requirement that regions of host memory that are to provide source and target buffers for RDMA memory transactions between transacting applications running on the servers be registered to their respective RDMA adapters. The procedural flow diagrams of FIGS. 3A and 3B provide a high-level description of the memory registration process as is currently known to those of skill in the art. At step 300, the host processor issues an RDMA type memory transaction request at the behest of some application running on the host processor. This RDMA request specifies the use of memory region x within its host memory as one of the buffers to be used in the transaction. At step 305, it is first ascertained if memory region x is already registered. If YES, processing of the RDMA request continues at 320. If NO, processing continues at 310 where a call to the appropriate RDMA verb for the memory registration process is made for memory region x. Processing of the RDMA memory transaction request is then blocked by the RI executing the memory registration process until the memory registration process call is returned as complete at 315. Processing of the RDMA memory transaction cannot be continued at 320 until the memory registration process is complete and the call is returned. Once the call is returned, the RI generates a work request for the transaction and this is enqueued in the appropriate queue (i.e. the SQ or the RQ) of the appropriate QP. Processing of the work request is then taken up by the adapter's transaction pipeline as resources permit.

FIG. 3B illustrates a high-level procedural flow of the memory registration process 310 called by the process of FIG. 3A known to those of skill in the art. At 350, it is determined if the adapter resources (e.g. adapter memory resources) are available to perform the process and if NO, an error message is generated at 380 and processing returns at 385. Otherwise, processing continues at 355 where the host allocates a buffer in host memory to establish a physical page list for the memory region to be later provided to the adapter. At 360, the host requests the list of pages that make up memory region x and has them pinned by the operating system. Pinning the pages ensures that the host doesn't change the virtual to physical translation until the memory region is no longer registered. The physical addresses for each of the pages are then returned by the operating system at 365. At 370, the host stores the physical addresses within its page list. The adapter then receives and stores access rights along with the complete physical page list for memory region x at 375. Processing then returns to the calling application at 385 (for example, step 310, FIG. 3A). Thus, it can be seen from the foregoing procedural flows of the prior art that the memory registration process completely gates the processing of RDMA type memory transactions and thus any delays in processing memory registration operations can significantly increase the latency (and therefore decrease throughput) of the network in processing network level RDMA type transactions.

Figure 4:
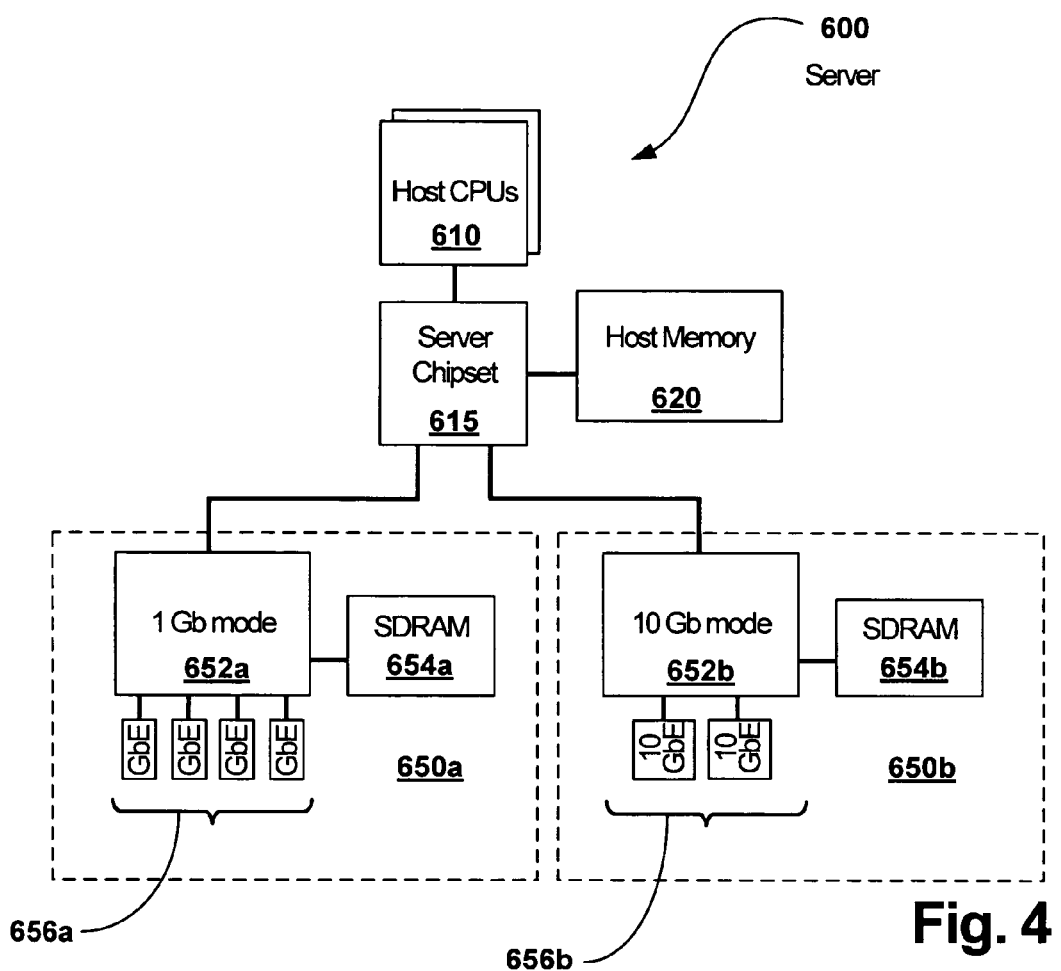
FIG. 4 is a block diagram of a computer system including RDMA capable adapters that includes various features and embodiments of the present invention.

FIG. 4 illustrates a high-level block diagram of an embodiment of a server of the present invention. The server 600 includes one or more host processors 610 and host memory 620. Server 600 also includes a memory management unit (MMU not shown) that permits the processor 610 to access the memory 620 as a contiguous virtual memory while performing a virtual to physical address translation to facilitate access to the non-contiguous memory locations physically occupied by the memory regions in the host memory 620. The server also includes a server chipset 615 that interfaces through a known bus interface such as PCI bus with one or more RDMA compatible adapters 650 capable of various throughput rates over the network (e.g. 1 Gigabit 650a and 10 Gigabit 650b). Each adapter includes adapter processing circuitry 652 and local adapter memory 654. Finally, physical interfaces 656a, 656b to the network are also provided. It should be noted that the RDMA compatible adapters 650 may be compatible with any known RDMA standard that requires or may benefit from the pre-registration of memory regions with network adapters, including but not limited to Infiniband and iWARP.

Figure 5A:
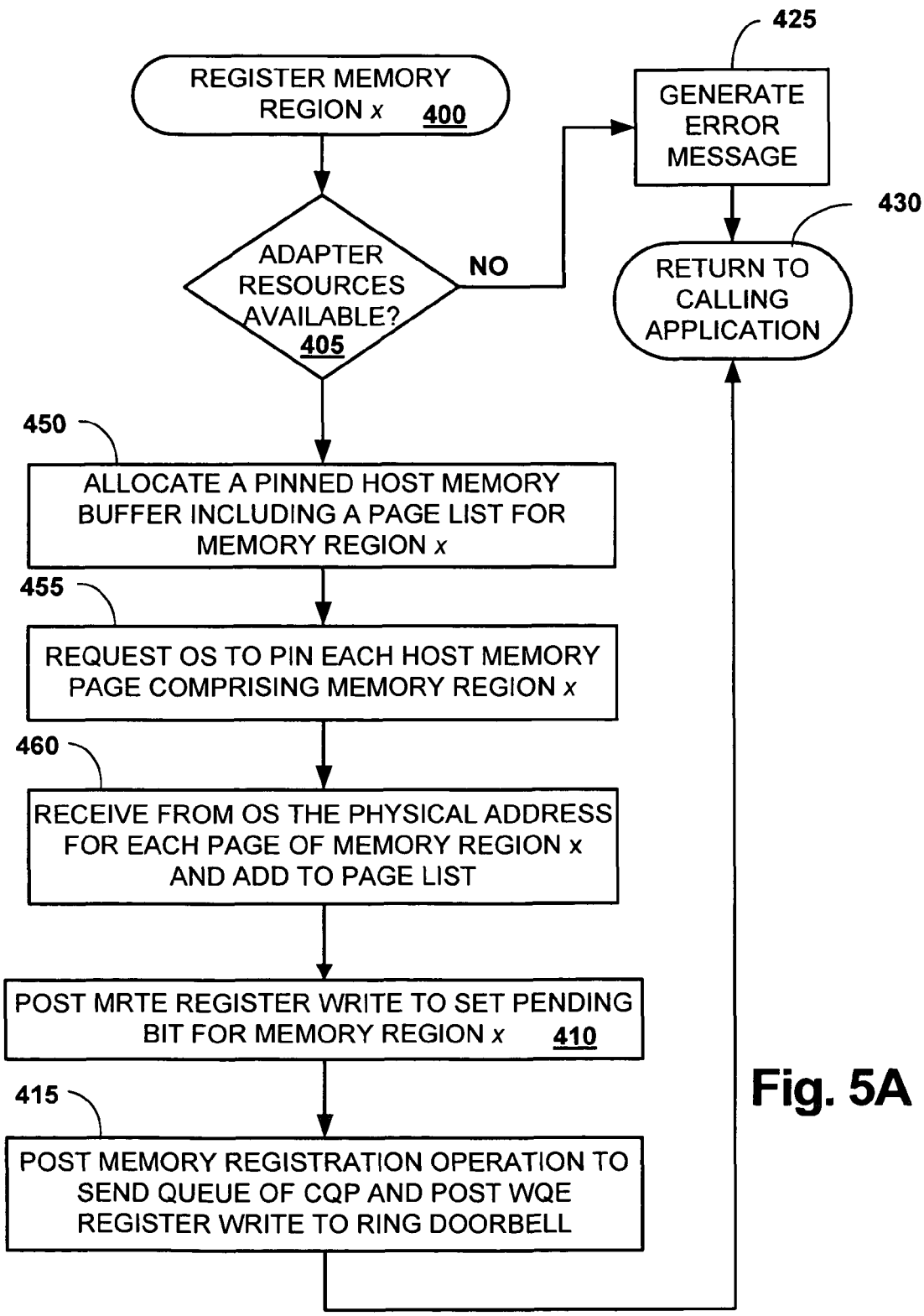
FIG. 5A is a process flow diagram describing a pipelined memory registration process performed by the computer system of FIG. 4 and in accordance with embodiments of the present invention.
Figure 5B:
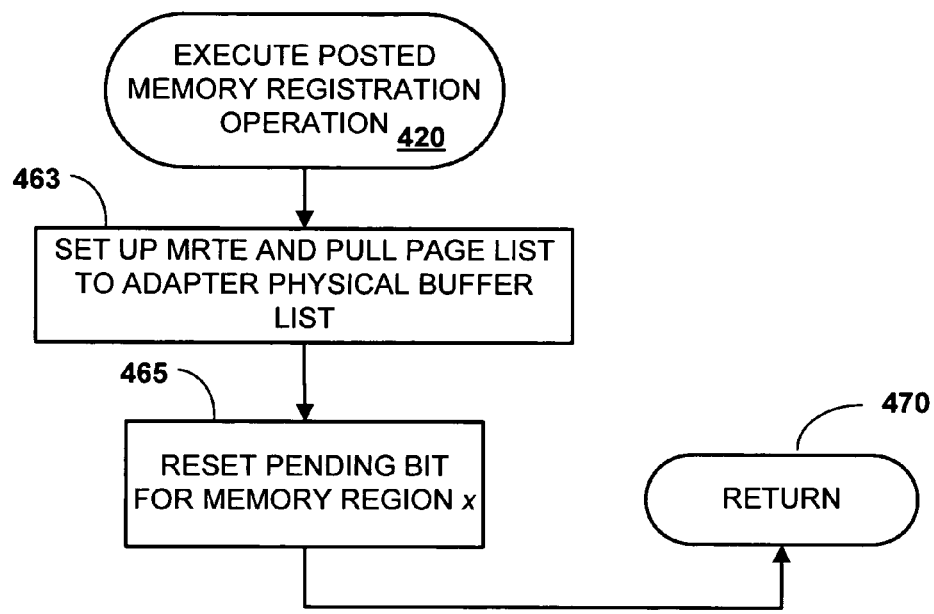
FIG. 5B is a process flow diagram describing execution of a posted memory registration operation performed by the computer system of FIG. 4 and in accordance with embodiments of the present invention.

FIGS. 5A and 5B illustrate high-level procedural flow diagram in accordance with embodiments of the present invention for which the memory registration process has been pipelined with the processing of network level RDMA requests. It should be noted that the process of executing the RDMA request that is necessitating the memory registration appears virtually the same as that of FIG. 3A. This is because the pipelining of the memory registration process in accordance with embodiments of the present invention is transparent to the host processor of the server and therefore to those processes performed by the host processor. The difference is that when the RDMA verb for the memory registration process of memory region x is called, processing begins at step 400 of FIG. 5A. A description of the procedural flow is now presented with additional reference to FIGS. 6A and 6B, which together illustrate a more detailed block diagram of the server 600 of FIG. 4.

An application running on host processor (610, FIG. 6A) of server 600 first initiates an RDMA-type memory transaction that results in a memory registration verb call appropriate to the particular RDMA type memory transaction. Those of skill in the art will recognize that these verb calls are standard or protocol specific and are defined in the specification developed for the particular RDMA standard employed. The present invention is intended to operate with all such standards that require memory registration and/or virtual to physical translation of page lists for physical buffer locations.

Figure 6A:
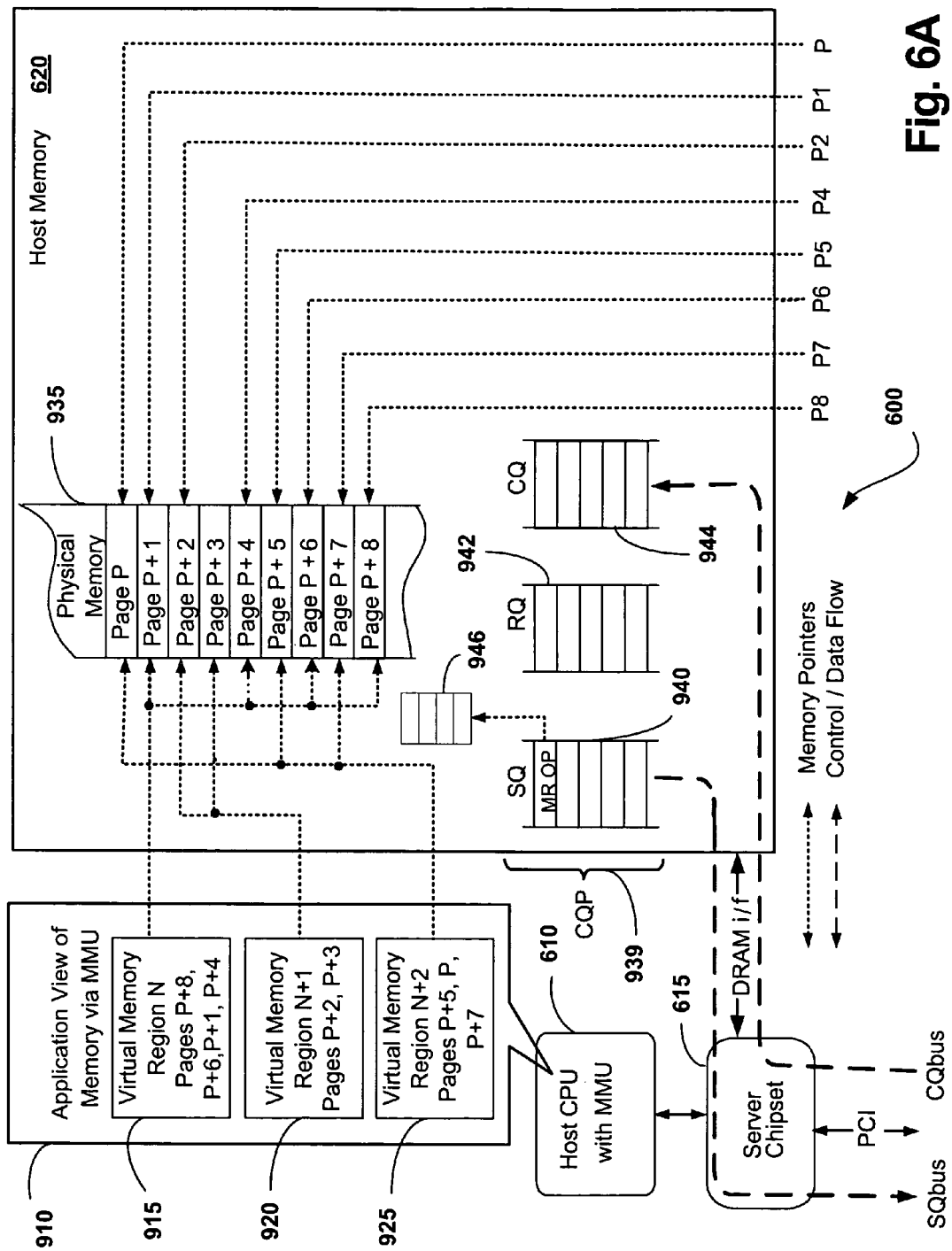
FIGS. 6A and 6B are a logical block diagram of an embodiment of the server of FIG. 4.

Provided that the adapter resources (e.g. sufficient adapter memory 654, FIG. 6a in which to store the requisite translated physical page address information) are available as determined at 405, processing continues at steps 450, 455 and 460, where the physical addresses for the individual pages contained in the page list 946, FIG. 6A are pinned and imported into the host memory. For example, if x=N, then the memory region x that is to be registered corresponds to the contiguous virtual memory region N 915, FIG. 6A which physically translates to physical memory pages in the host memory 620 having physical addresses P+8, P+6, P+1, and P+4. At 410 the host processor (610, FIG. 6A) enqueues a register write to an MRTE Management register on register write queue (952, FIG. 6B). The MRT write interfaces through the local memory interface (LMI) (972, FIG. 6B) with memory registration table (MRT) 980 located in adapter memory 654. This register write is communicated through the PCI host interface of the Server Chip Set 615, FIG. 6A and causes the Protocol Engine 901, FIG. 6B to set a pending bit in the appropriate MRT entry (MRTE) associated with memory region x (for example, MRTE N of MRT 980, FIG. 6B). Processing then continues at 415, FIG. 5A where the host processor (610, FIG. 6A) posts a memory registration operation (MR OP) onto the send queue (SQ) 940, FIG. 6A of the control queue pair (CQP) 939 being maintained in the host memory 620, FIG. 6A of the server. The MR OP points to a pinned host page list 946 for the memory region being registered. The host processor (610, FIG. 6A) then enqueues on queue 952, FIG. 6B a register write to the work queue entry (WQE) allocate register to let the CP 964, FIG. 6B know that is has work pending in the CQP 939, FIG. 6A. Processing continues by returning to the calling application at 430, FIG. 5A.

Thus, the RI is now free to continue processing the RDMA type memory request operation to this memory region x even though the actual registration process may not as of yet begun. The RI is now free to post a work request on the appropriate QP to initiate the processing of the transaction. This also involves a write to the WQE allocate register, which informs the CUWS 954, FIG. 6B of the work request that must be processed.

Figure 6B:
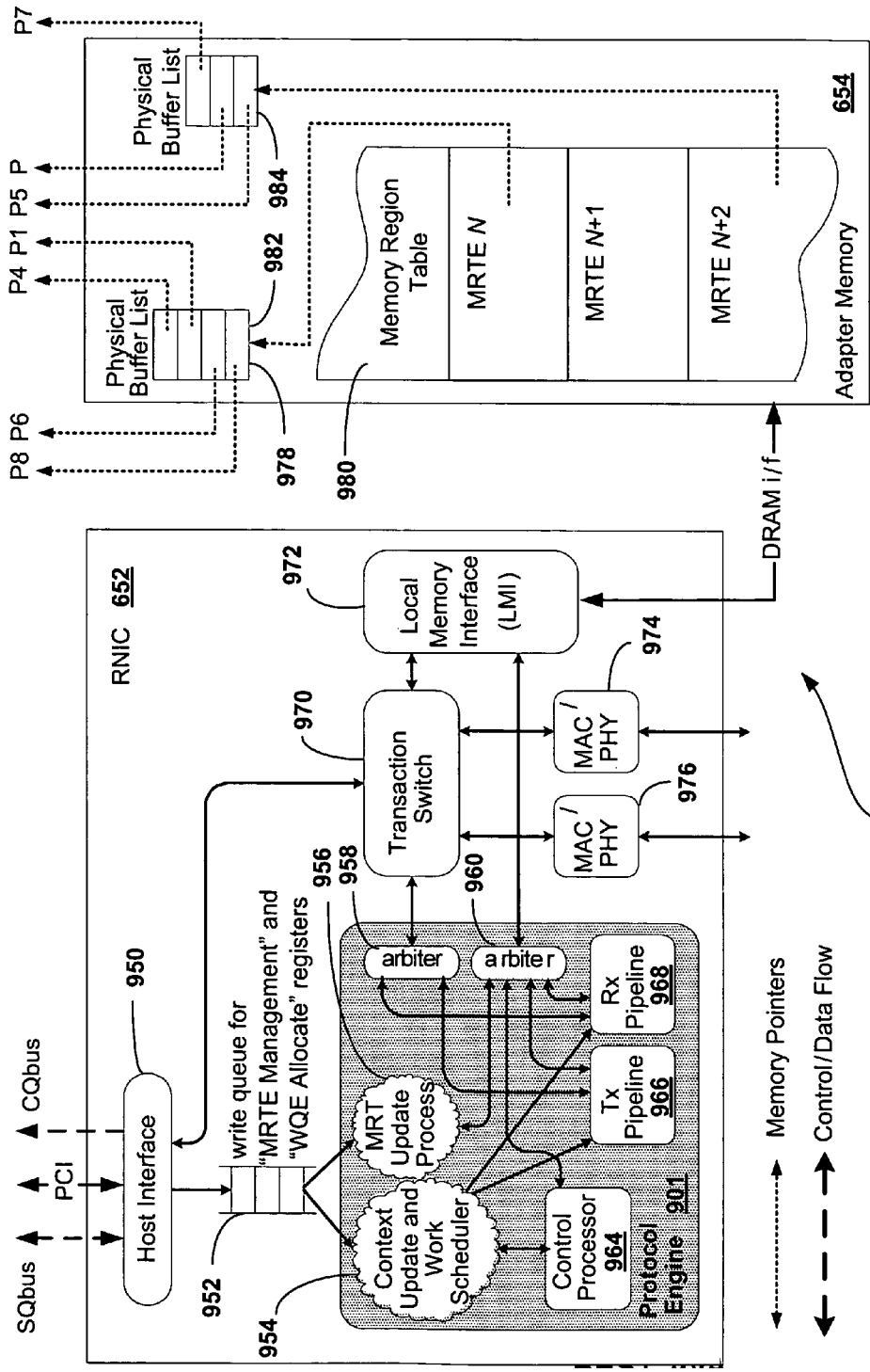

Once received over the SQbus and scheduled for execution by the context update and work scheduler (CUWS) 954, FIG. 6B the CP 964 begins execution of the MR OP that was posted in the SQ 940, FIG. 6B of the CQP 939, thereby performing the memory registration process beginning at 420, FIG. 5B.

At 463 the adapter 652, FIG. 6B, more specifically the CP 964, FIG. 6B, sets up an MRTE, such as MRTE 981, FIG. 6B; and pulls the page list, such as page list 946, FIG. 6A which contains the entries for memory region N 615, FIG. 6A, into a physical buffer list (PBL) 978, FIG. 6B. Once this process is complete, processing continues at 465 where the pending bit in MRTE N (memory region x=N) is reset by the MRTE update process to indicate completion of the MR OP for that memory region. At this point, a completion entry may be sent from the MRTE updates process to the CQ 944, FIG. 6a of the CQP 939 to indicate that the entry containing the completed MR OP may now be reused for another control operation.

Figure 5C:
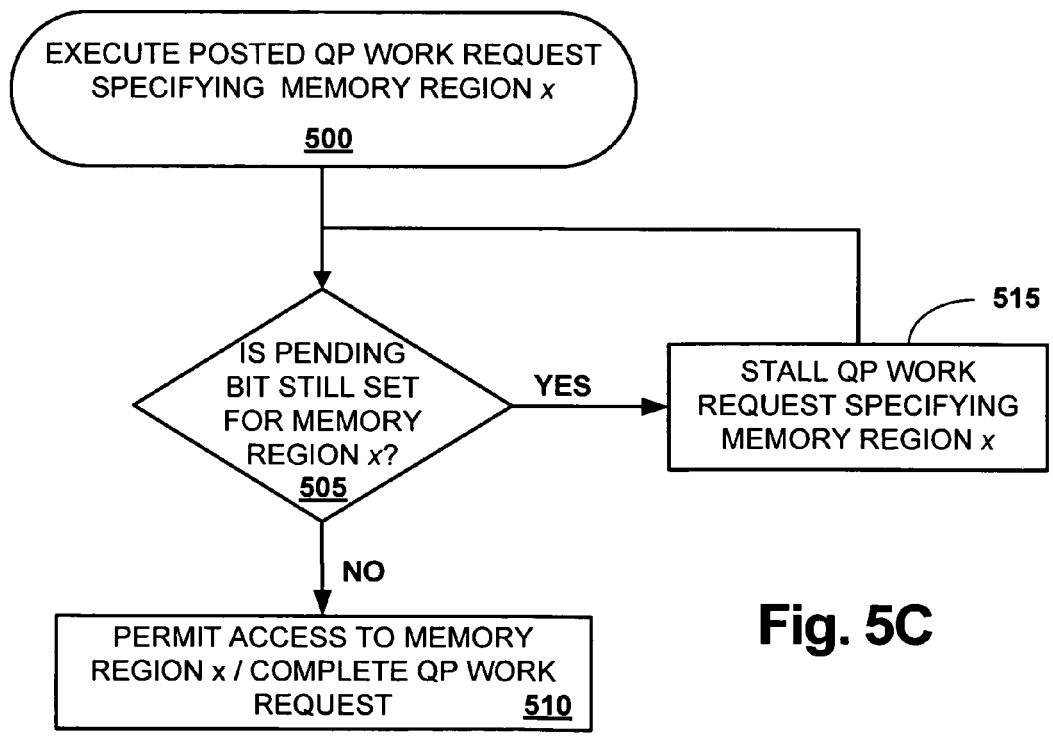
FIG. 5C is a process flow diagram describing execution of a posted QP operation performed by the computer system of FIG. 4 and in accordance with embodiments of the present invention.

Thus, the memory registration process and the associated work request are able to proceed in parallel and independent of one another. The CP 964 is free to process management control operations (including the MR OPs) posted to the CQP 939 and the transaction pipeline (including the transmit (TX) 966 and receive (Rx) 968 pipelines) proceed with processing the QP work request (500, FIG. 5C) independently. Thus, in embodiments of the invention, the transaction processing for the QP work request referencing memory region x=N may begin independently of the completion of the MR OP for memory region x=N. If the adapter transaction pipeline gets ahead in processing of the QP work request prior to completion of the MR OP, the transaction pipeline will recognize that the pending bit is still set (502, FIG. 5C) and will either stall the execution of the work request or it will re-schedule the work request and resume processing it once the pending bit for that memory region has been reset (504, FIG. 5C). In the case of the reverse, the MR OP completes first and thus the physical page list is available when the QP work request is being executed. The adapter transaction pipeline is then able to access the appropriate physical memory locations to sink or source data in completing the QP OP by acquiring the physical page addresses from the PBL associated with the memory region specified by the QP work transaction.

Specific examples of the pipelined execution of work requests in parallel with the memory registration operations in accordance with embodiments of the invention are illustrated in FIGS. 7 and 8. In FIG. 7, a sequence diagram is provided for illustrating one possible outcome scenario in the processing of an RDMA type memory transaction called a "local SEND operation." Each column of the figure represents one of the processing nodes that may be involved in the overall processing of the transaction, including the local application node (includes a local application program running on the host processor 610, FIG. 6A of a local server), the adapter control processor (CP) 964, FIG. 6B running on the adapter 652, FIG. 6B of the local server that executes control operations including memory registration operations, the local adapter transmit 966, FIG. 6B/receive 968, FIG. 6B transaction pipeline that is executed on the adapter 652, FIG. 6B for handling work requests associated with RDMA-type memory requests transactions, and finally the application running on the remote server of cluster (not shown) with which the local server is or may be communicating over the network. Each row of the diagram indicates a non-specific time frame which is sequentially later in time than the row above it.

The example of FIG. 7 illustrates the pipelined processing of a local SEND operation, which does not actually involve the movement of data to another server on the network. It is nevertheless an RDMA transaction that requires that the memory region comprising the source buffer for the data first be registered with the local adapter. Thus, as indicated in the first time point of the sequence (Row 1), the first step for the RI running on the local server host processor 610, FIG. 6A in accordance with embodiments of the invention is to call the memory registration verb for the memory region specified by the SEND operation. The calling of this process includes enqueueing of an MRTE Management register write on register write queue 952, FIG. 6B (as previously described) that sets the pending bit for the MRTE in the MRT 980, FIG. 6B corresponding to the memory region that needs to be registered. The MR OP associated with the memory registration necessitated by the local SEND OP is then posted to the SQ of the local adapter's CQP. The MR OP entry in the SQ includes all of the relevant information for the memory region, including a page list pointer and access privileges for the region, etc. Finally, a WQE allocate register write is posted to the registration write queue 952, FIG. 6B by the local server host processor 610, FIG. 6A to ring the doorbell of the CUWS 954, FIG. 6B to let it know that a control op has been posted for it to schedule and process.

As previously mentioned, a call to the registration verb is returned after the foregoing steps have been performed, notwithstanding that the MR OP has not yet been processed. As shown in Row 2, this permits the RI running on the local server host processor 610, FIG. 6A to post its local SEND OP on one of its QPs (e.g. $QP_N$). This process also includes a WQE Allocate register write that again rings the doorbell to let the adapter's work scheduler 954, FIG. 6B know that a transmit pipeline operation needs to be processed. Simultaneously with, before or after the foregoing steps, the local adapter CP 964, FIG. 6B begins processing the MR OP posted to the SQ of the CQP previously and in accordance with the procedure flow diagram of FIG. 5B. As indicated, this includes setting up the MRTE in the adapter memory for the memory region x, pulling the page list from the host memory and obtaining the physical translations for the page addresses and storing them in a physical buffer list (PBL) in local adapter memory 654.

As indicated in Row 3 of FIG. 7, at some point subsequent to the posting of the QP SEND op, the local transmit pipeline begins processing the posted SEND op. If the processing of the MR OP has not completed (or even started for that matter), then the pending bit will be set and the processing of the SEND op is suspended until the pending bit is reset, indicating that registration for the memory region accessed by the SEND op has been completed. In Row 4 of the parallel sequence of FIG. 7, the MR OP processing is completed and the pending bit is subsequently cleared as a result. A completion indicator may be sent to the completion queue CQ 944, FIG. 6A of the CQP 939 over the CQbus by the MRT update process 956, FIG. 6B running on CP 964 to indicate that the SQ entry formerly occupied by the MR OP is now available by which to queue other control ops such as another MR OP for another RDMA type memory transaction. Finally, as shown in Row 5, once this has been accomplished, the work scheduler 954 can reschedule the processing of the SEND op and processing is resumed until completed by the transmit pipeline processor 966.

Those of skill in the art will appreciate that the example of FIG. 7 illustrates only one possible sequence for the resolution of the operations running in parallel. The sequence shown in FIG. 7 serves to illustrate the scenario where the MR OP loses the race to the processing of the SEND OP and as such the SEND OP must be suspended until the memory registration process is complete. Also possible (and more likely) is that processing the MR OP is completed ahead of the SEND OP and thus no suspension of the transmit pipeline or rescheduling of the SEND OP would be necessary.

In the example of FIG. 8, a remote RDMA Write transaction is illustrated that requires communication with a remote node of the network. In this case, the process starts out in the time period delineated by Row 1 as it did in the example of FIG. 7, wherein a memory registration verb call is made by the RI running on the local server in connection with the RDMA Write. As a result of that call, a register write to the MRTE Management register is queued which establishes an MRTE entry for the memory region x to be registered and sets the pending bit in that entry. An MR OP is then posted to the SQ of the CQP of the local server representing the registration that must take place as previously discussed. Finally, a write to the WQE allocate register notifies (rings the door bell) for the Context Update and Work Scheduler 954 to notify it of the pending work (i.e. the MR OP) in the CQP. The server processor then returns from the verb call.

Once returned from the verb call, the RI is free to post a SEND OP on its $QP_N$ that advertises to the remote application running on the remote server that the source of the data will be sourced from memory region x using an STag=x. Those of skill in the art will recognize that the STag (also know as a Steering Tag) is the format defined by the iWARP specification for identifying memory regions. This posted SEND also requests an RDMA write operation. This is indicated in Row 2 of the pipelined sequence. This posted SEND also includes a write to the WQE allocate register to notify the Context Update and Work Scheduler 954, FIG. 6B to notify it of the pending work in the $QP_N$. Before, simultaneously with or after the foregoing activities, the local adapter CP may begin processing the MR OP for memory region x. This involves setting up the MRTE, pulling the page list from host memory and setting up the physical buffer list in the adapter memory as previously described.

At some time in the future, the TX pipeline of the local adapter begins to process the SEND OP, but because this SEND OP does not require access to the memory region x, its processing does not need to be suspended notwithstanding that the MR OP has not yet completed. This step is indicated in Row 3 of the sequence. Sometime after, as indicated in Row 4, the remote node receives the SEND OP requesting the RDMA Write operation to the memory region x STag and this is posted on the SQ of the remote node's QP.

At some point in the future, as indicated in Row 5, the local server adapter's RX pipeline receives the RDMA write as a work request from the remote server, but because the memory region x is going to be the sink for this transaction, and because in this scenario the pending bit has yet to be cleared for memory region x because the MR OP has not been completed, the RX pipeline processing of this RDMA write work request is suspended until that happens. Finally, in Row 6, the MR OP has been completed and the pending bit has been cleared through mechanisms previously discussed, and thus the RDMA Write Op work request is resumed and completed to memory region x subsequently in Row 7.

Those of skill in the art will appreciate that it is much more likely that the MR OP will have been completed while the servers are exchanging operations (i.e. Rows 3, 4 and 5) and that the completion of the RDMA transaction will not be held up. Moreover, it should be appreciated that the scenario illustrated in FIG. 8 might be any one of a number of possible sequences but is for purposes of illustrating the scenario where the RDMA Write OP work request wins the race with the MR OP process and requires stalling of the adapter pipeline processing of the network transaction pending completion of the memory registration process for memory region x.

RDMA Read operations are similar to the RDMA Write operations as shown in FIG. 8 except that the remote node does not need to post an operation as the remote node simply performs the read operation.

Figure 9:
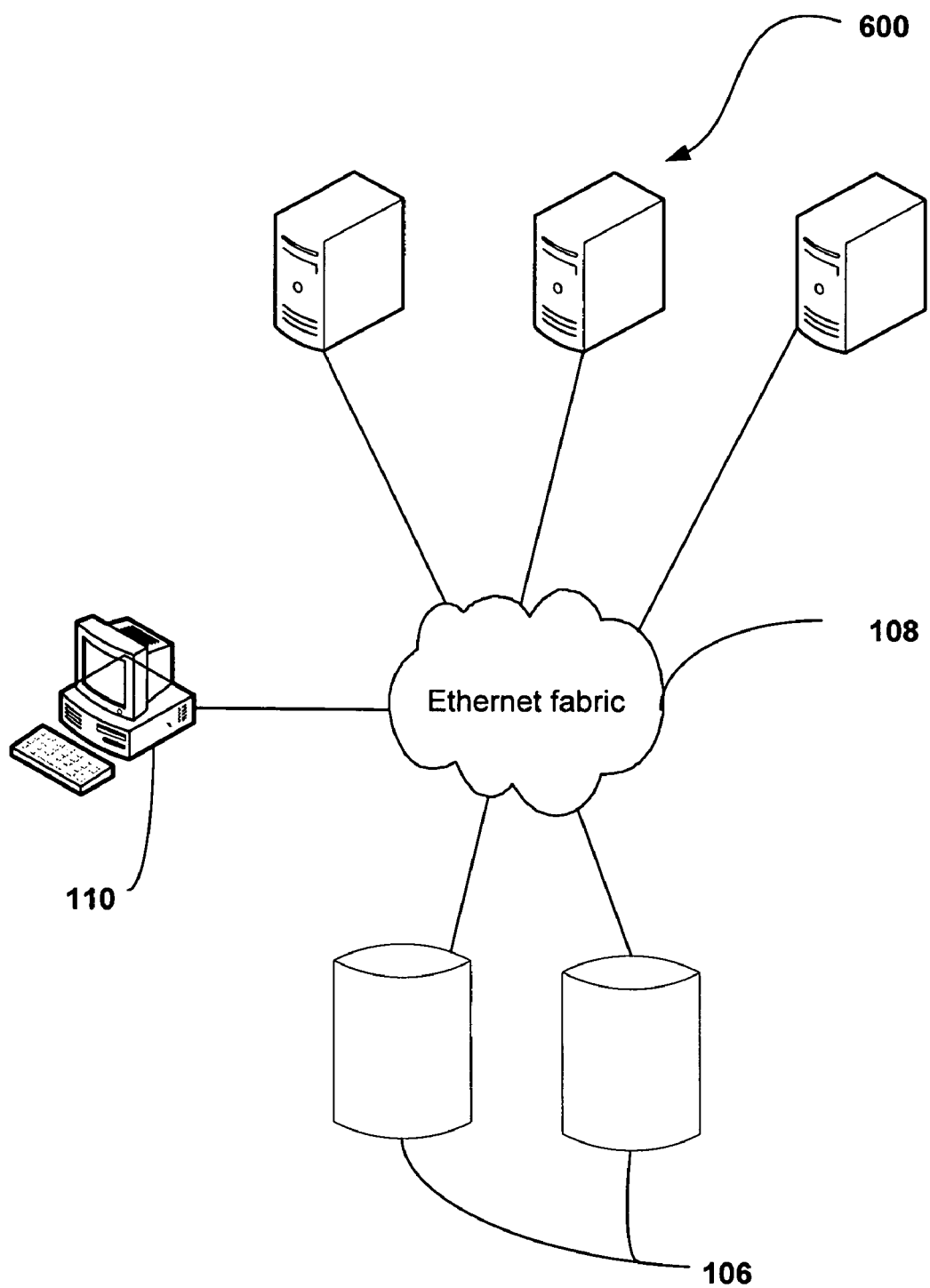
FIG. 9 is a block diagram of a computer system combining the fabrics for clustering, user access and storage area networking into all one Ethernet fabric according to the present invention.

FIG. 9 illustrates an embodiment of a network topology wherein clustering transactions, user transactions and high-performance storage access transactions may all be performed over a single fabric such as Ethernet 108. In an embodiment, the pipelining of the memory registration process occurs in the same manner as previously discussed. However, the embodiment of FIG. 9 has the additional advantage of requiring only one adapter and one fabric to process all network transaction types. A more detailed view of an embodiment of a protocol engine 901, FIG. 6B is illustrated in FIG. 10 that is capable of performing the pipelining of the memory registration process (and all management control operations) as previously described as well as to handle all three types of network transactions with one adapter.

Figure 10:
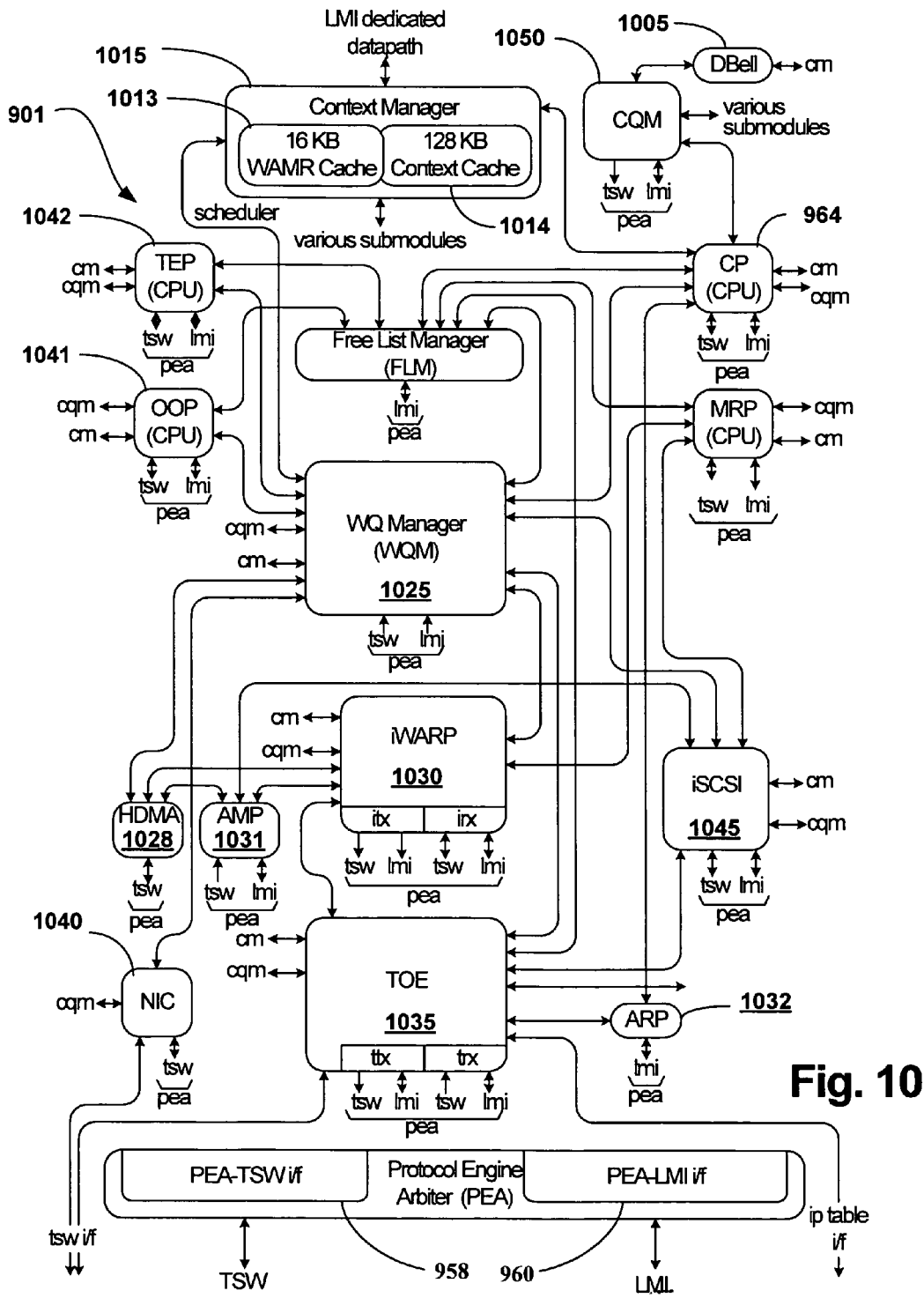
FIG. 10 is a logical block diagram of an embodiment of the protocol engine of the server of FIGS. 6A and 6B.

FIG. 10 is a more detailed block diagram of an embodiment of the protocol engine 901, FIG. 6B of the adapter 650 of FIG. 6B. This embodiment of the protocol engine 901 is useful to achieve the system topology of FIG. 9 as it provides functionality necessary to handle user, clustering and high-performance storage access transactions over a single adapter and thus a single Ethernet network. As previously discussed, the adapter handles both traditional RDMA memory transaction work requests as well as management control operations including memory registration operations. The TX 966/RX 968 FIG. 6B pipeline includes various processing stages to handle the processing of the three types of network transactions, depending upon whether they are user transactions (e.g. TCP/IP packetized data over conventional sockets type connections), RDMA offloaded connections (iWARP connections for direct data placement), or high-performance storage transactions (such as in accordance with the iSCSI standard).

As shown in the block diagram of FIG. 6B, a protocol engine arbiter 958/960 is connected to the transaction switch 970 and the local memory interface 972 to provide a point of contact between the protocol engine 901 and those devices. Various subcomponents of the transaction pipeline of the protocol engine 901 have their access arbitrated to those two devices by the protocol engine arbiter 958/960. In basic operation a series of tasks are performed by the various modules or sub-modules in the protocol engine 901 to handle the various iWARP, iSCSI and regular Ethernet traffic (including the QP operations). A context manger 1015 has a dedicated datapath to the local memory interface. As each connection which is utilized by the adapter 650 must have a context, various subcomponents or submodules are connected to the context manager 1015 as indicated by the arrows captioned cm. The context manager 1015 contains a context cache 1014, which caches the context from the local adapter memory 654, FIG. 6B, and a work available memory region cache 1013, which contains memory used to transmit scheduling algorithms to determine which operations occur next in the protocol engine 901.

The schedules are effectively developed in a work queue manager (WQM) 1025. The WQM 1025 handles scheduling for all transmissions of transactions of all protocol types in the protocol engine 901. One of the main activities of the WQM 1025 is to determine when data needs to be retrieved from the adapter memory 654, FIG. 6B for operation by one of the various modules. The WQM 1025 handles this operation by requesting a time slice from the protocol engine arbiter 958/960 to allow the WQM 1025 to retrieve the desired information and place it in a work queue. A completion queue manager (CQM) 1050 acts to provide task completion indications to the CPUs 610. The CQM 1050 handles this task for various submodules with connections to those submodules indicated by arrows captioned by cqm. A doorbell submodule 1005 receives commands from the host, such as "a new work item has been posted to SQ x," and converts these commands into the appropriate context updates.

A TCP off-load engine (TOE) 1035 includes sub modules of transmit logic and receive logic to handle processing of accelerated TCP/IP connections. The receive logic parses the TCP/IP headers, checks for errors, validates the segment, processes received data, processes acknowledges, updates RTT estimates and updates congestion windows. The transmit logic builds the TCP/IP headers for outgoing packets, performs ARP table look-ups, and submits the packet to the transaction switch 970, FIG. 6B. An iWARP module 1030 includes a transmit logic portion and a receive logic portion. The iWARP module 1030 implements various layers of the iWARP specification, including the MPA, DDP and RDMAP layers. The receive logic accepts inbound RDMA messages from the TOE 1035 for processing. The transmit logic creates outbound RDMA segments from PCI data received from the host CPUs 610, FIG. 6A. A NIC module 1040 is present and connected to the appropriate items, such as the work queue manager 1025 and the protocol engine arbiter 958/960. An iSCSI optional module 1045 is present to provide hardware acceleration to the iSCSI protocol as necessary.

Typically the host operating system provides the adapter 650 with a set of restrictions defining which user-level software processes are allowed to use which host memory address ranges in work requests posted to the adapter 650. Enforcement of these restrictions is handled by an accelerated memory protection (AMP) module 1028. The AMP module 1028 validates the iWARP STags using the memory region table (MRT) 980, FIG. 6B and returns the associated physical buffer list (PBL) information. An HDMA block 1031 is provided to handle the DMA transfer of information between host memory 620, via the bus 950, and the transaction switch 970 on behalf of the WQM 1025 or the iWARP module 1030. An ARP module 1032 is provided to retrieve MAC destination addresses from the memory. A free list manager (FLM) 1034 is provided to work with various other modules to determine the various memory blocks which are available.

As previously discussed, when work has been placed on a QP or a CQP, a doorbell is rung to inform the protocol engine 901 that work has been place in those queues that must be performed. Doorbell 1005 is provided to form an interface between the host CPU 610, FIG. 6A and the protocol engine 901 to allow commands to be received and status to be returned. The protocol engine 901 of the preferred embodiment also contains a series of processors to perform required operations. As previously discussed, one of those processors is a control queue processor (CP) 964 that handles management control operations such as the memory registration operations. In this way, the control operations such as the MR OPs are given their own pipeline in which to be processed in parallel with the QP transmit 966/receive 968 pipeline formed by the components discussed above for processing QP work requests. The control queue processor CP 964 performs commands submitted by the various host drivers via control queue pairs CQPs 939, FIG. 6A as previously outlined above.

The CP 964 has the capability to initialize and destroy QPs and memory window and regions. As previously discussed, while processing RDMA QP transactions, the iWARP module 1030 and other QP transaction pipeline components monitor the registration status of the memory regions as maintained in the MRT in the adapter memory and will stall any QP work requests referencing memory regions for which registration has not yet completed (i.e. for which the pending bit is still set). Stalled QP work requests can be rescheduled in any manner known to those of skill in the art. The rescheduled QP work transactions will be permitted to complete when a check of the pending bit for the referenced memory region of each work request has been cleared.

A second processor is the out-of-order processor (OOP) 1041. The out-of-order processor 1041 is used to handle the problem of TCP/IP packets being received out-of-order and is responsible for determining and tracking the holes and properly placing new segments as they are obtained. A transmit error processor (TEP) 1042 is provided for exception handling and error handling for the TCP/IP and iWARP protocols. The final processor is an MPA reassembly processor 1044. This processor 1044 is responsible for managing the receive window buffer for iWARP and processing packets that have MPA FPDU alignment or ordering issues.

Embodiments of the present invention have been disclosed herein that provide a pipeline for handling management control operations such as memory registration that is independent of the one that handles QP work requests generated for RDMA type memory transactions. In embodiments of the invention, the queue pair paradigm is leveraged to make integration of the control pipeline with the QP work request pipeline more straightforward. The QP work request pipeline monitors the completion of pending memory registration operations for each memory region, and stalls the processing of any QP transactions using memory regions for which registration has not completed. Because most of the control operations will complete before the processing of their associated QP work requests complete, the latency that is typically associated with the control operations such as memory registration is eliminated and throughput of the network is increased. Because the processing of those QP work requests that do win the race may be suspended and rescheduled, the serial nature of the registration process is still maintained per existing RDMA standards, and the mechanism is hidden from the applications running on the servers in a network such as a server cluster.

It will be understood from the foregoing description that modifications and changes may be made in various embodiments of the present invention without departing from its true spirit. The descriptions in this specification are for purposes of illustration only and are not to be construed in a limiting sense. The scope of the present invention is limited only by the language of the following claims.

What is claimed is:

1. An apparatus comprising:
 a remote direct memory access (RDMA) adapter to be comprised in a server and to be coupled in the server to a plurality of host processors and to a host memory via a host interface, one of the host processors to initiate an RDMA transaction to be implemented by the adapter, the adapter to be coupled via physical interfaces to a network, the adapter including an offload engine, a local adapter memory interface, and protocol modules associated with respective protocols, one of the protocol modules to implement iWARP RDMA protocol layers and RDMA direct data placement, another of the protocol modules being an iSCSI protocol module to provide hardware acceleration to iSCSI protocol processing, the adapter to selectively permit data received from the host processors and the network to be provided to the protocol modules and the offload engine, the adapter to be programmed in support of an RDMA memory transaction requested by an RDMA transaction request from an application, a first pipeline portion of the adapter to enqueue a pending memory registration operation to register a memory region specified by the RDMA memory transaction, a second pipeline portion of the adapter to enqueue a work request specifying access to the memory region, processing of the work request to proceed as if the pending memory registration operation has already been completed unless the adapter is notified to stall completion of the work request until after memory registration operation processing is complete, the host memory including a plurality of memory regions, the adapter including a control operation portion having the first pipeline portion, a work request portion having the second pipeline portion, and a memory region table, a program being to queue a control operation of the RDMA transaction request in the first pipeline portion and to set a pending notification in the memory region table associated with the control operation and a relevant memory region of the plurality of memory regions, the program also being to queue the work request of the RDMA transaction request in the second pipeline portion, the control operation portion being to reset the pending notification as a result of completion of the control operation, and the work request portion being to delay processing of the work request if the pending notification is set and to complete processing of the work request if the pending notification is reset.

2. The apparatus of claim 1, wherein:
the local adapter memory interface is coupled to local adapter memory; and
the host interface is comprised in the adapter and is coupled to a chipset, the chipset coupling the host processors to the adapter and to the host memory.

3. The apparatus of claim 2, further comprising:
a transaction switch to selectively permit the data to be provided to the protocol modules, the offload engine, and the local adapter memory interface.

4. The apparatus of claim 1, wherein:
the host memory includes a control queue pair; and
queuing of the control operation includes posting the control operation in the control queue pair.

5. The apparatus of claim 4, wherein:
the adapter also includes a register to receive entries for the memory region table; and
setting of the pending notification also includes performing a register write operation to the register.

6. The apparatus of claim 5, wherein:
the adapter also includes a doorbell to receive notification that the control operation has been posted; and
the queuing of the control operation comprising ringing the doorbell.

7. The apparatus of claim 6, wherein:
delaying the processing of the work request comprises rescheduling the work request in the second pipeline portion.

8. The apparatus of claim 6, wherein:
the second pipeline portion is a transmit pipeline.

9. A method comprising:
coupling in a server a remote direct memory access (RDMA) adapter comprised in the server to a plurality of host processors and to a host memory via a host interface, one of the host processors to initiate an RDMA transaction to be implemented by the adapter, the adapter to be coupled via physical interfaces to a network, the adapter including an offload engine, a local adapter memory interface, and protocol modules associated with respective protocols, one of the protocol modules to implement iWARP RDMA protocol layers and RDMA direct data placement, another of the protocol modules being an iSCSI protocol module to provide hardware acceleration to iSCSI protocol processing, the adapter to selectively permit data received from the host processors and the network to be provided to the protocol modules and the offload engine, the adapter to be programmed in support of an RDMA memory transaction requested by an RDMA transaction request from an application, a first pipeline portion of the adapter to enqueue a pending memory registration operation to register a memory region specified by the RDMA memory transaction, a second pipeline portion of the adapter to enqueue a work request specifying access to the memory region, processing of the work request to proceed as if the pending memory registration operation has already been completed unless the adapter is notified to stall completion of the work request until after memory registration operation processing is complete, the host memory including a plurality of memory regions, the adapter including a control operation portion having the first pipeline portion, a work request portion having the second pipeline portion, and a memory region table, a program being to queue a control operation of the RDMA transaction request in the first pipeline portion and to set a pending notification in the memory region table associated with the control operation and a relevant memory region of the plurality of memory regions, the program also being to queue the work request of the RDMA transaction request in the second pipeline portion, the control operation portion being to reset the pending notification as a result of completion of the control operation, and the work request portion being to delay processing of the work request if the pending notification is set and to complete processing of the work request if the pending notification is reset.

10. The method of claim 9, wherein:
the local adapter memory interface is coupled to local adapter memory;
the host interface is comprised in the adapter and is coupled to a chipset, the chipset coupling the host processors to the adapter and to the host memory.

11. The method of claim 10, wherein:
a transaction switch is to selectively permit the data to be provided to the protocol modules, the offload engine, and the local adapter memory interface.

12. The method of claim 9, wherein:
the host memory includes a control queue pair; and
queuing of the control operation includes posting the control operation in the control queue pair.

13. The method of claim 12, wherein:
the adapter also includes a register to receive entries for the memory region table; and
setting of the pending notification also includes performing a register write operation to the register.

14. The method of claim 13, wherein:
the adapter also includes a doorbell to receive notification that the control operation has been posted; and
the queuing of the control operation comprising ringing the doorbell.

15. The method of claim 14, wherein:
delaying the processing of the work request comprises rescheduling the work request in the second pipeline portion.

16. The method of claim 14, wherein:
the second pipeline portion is a transmit pipeline.

* * * * *